(12) United States Patent
Gates et al.

(10) Patent No.: US 12,067,536 B2
(45) Date of Patent: Aug. 20, 2024

(54) SYSTEM AND METHOD FOR WASTE MANAGEMENT

(71) Applicant: Compology LLC, Pittsburgh, PA (US)

(72) Inventors: Jason Skylar Gates, Pittsburgh, PA (US); Benjamin Chehebar, Pittsburgh, PA (US)

(73) Assignee: Compology LLC, Pittsburgh, PA (US)

( * ) Notice: Subject to any disclaimer, the term of this patent is extended or adjusted under 35 U.S.C. 154(b) by 0 days.

(21) Appl. No.: 18/110,613

(22) Filed: Feb. 16, 2023

(65) Prior Publication Data

US 2023/0196307 A1 Jun. 22, 2023

Related U.S. Application Data

(63) Continuation of application No. 16/288,593, filed on Feb. 28, 2019, now Pat. No. 11,610,185, which is a continuation of application No. 14/479,136, filed on Sep. 5, 2014, now abandoned, which is a continuation-in-part of application No. 14/211,709, filed on Mar. 14, 2014, now abandoned.

(60) Provisional application No. 61/801,021, filed on Mar. 15, 2013.

(51) Int. Cl.
*G06Q 10/30* (2023.01)
*G06Q 10/0631* (2023.01)
*G06T 7/00* (2017.01)
*H04N 7/18* (2006.01)

(52) U.S. Cl.
CPC ......... *G06Q 10/30* (2013.01); *G06Q 10/0631* (2013.01); *G06T 7/0008* (2013.01); *H04N 7/181* (2013.01); *G06T 2207/30232* (2013.01); *G06T 2207/30242* (2013.01); *Y02W 90/00* (2015.05)

(58) Field of Classification Search
CPC .. G06Q 10/30; G06Q 10/0631; G06T 7/0008; H04N 7/181
See application file for complete search history.

(56) References Cited

U.S. PATENT DOCUMENTS

| | | | |
|---|---|---|---|
| 4,485,831 | A | 12/1984 | Ungerleider |
| 4,646,793 | A | 3/1987 | Sherratt |
| 4,926,879 | A | 5/1990 | Sevrain et al. |
| 5,257,577 | A | 11/1993 | Clark |

(Continued)

FOREIGN PATENT DOCUMENTS

| | | | | |
|---|---|---|---|---|
| AU | 2013100511 B4 | 1/2014 | | |
| CA | 2558906 A1 | * | 4/2007 | ........... A61B 50/362 |

(Continued)

OTHER PUBLICATIONS

Gates, Jason, "Fullness Monitoring for Waste—Image-based vs. Ultrasonic Sensors", https://medium.com/@compology/fullness-monitoring-for-waste-image-based-vs-ultrasonic-sensors-29f360bf01e8, dated Jul. 11, 2017.

(Continued)

*Primary Examiner* — Hesham K Abouzahra
(74) *Attorney, Agent, or Firm* — K&L Gates LLP

(57) ABSTRACT

A method for waste management, including recording an image of content within a waste container; extracting a set of content parameters from the image; characterizing the content within the waste container based on the set of content parameters; and routing a waste removal vehicle based on the content characterization.

21 Claims, 7 Drawing Sheets

(56) References Cited

U.S. PATENT DOCUMENTS

| | | | |
|---|---|---|---|
| 5,299,493 | A | 4/1994 | Durbin et al. |
| 5,609,193 | A | 3/1997 | Steckler |
| 5,708,424 | A | 1/1998 | Orlando et al. |
| 5,812,060 | A | 9/1998 | Despain et al. |
| 5,927,142 | A | 7/1999 | Mercer |
| 5,964,258 | A | 10/1999 | Schoenbauer |
| 6,123,017 | A | 9/2000 | Little et al. |
| 6,125,213 | A | 9/2000 | Morimoto |
| 6,272,466 | B1 | 8/2001 | Harada et al. |
| 6,369,715 | B2 | 4/2002 | Bennett et al. |
| 6,561,085 | B1 | 5/2003 | Durbin et al. |
| 6,822,565 | B2 | 11/2004 | Thomas et al. |
| 6,951,615 | B2 | 10/2005 | Tripodi et al. |
| 7,032,820 | B2 | 4/2006 | Kreiner et al. |
| 7,313,464 | B1* | 12/2007 | Perreault ............... B25J 9/1666 700/262 |
| 7,421,112 | B2 | 9/2008 | Calver et al. |
| 7,423,541 | B2 | 9/2008 | Miller |
| 7,441,569 | B2 | 10/2008 | Lease |
| 7,728,730 | B2 | 6/2010 | Langlois et al. |
| 7,853,142 | B2 | 12/2010 | Meyers et al. |
| 7,979,146 | B2 | 7/2011 | Ullrich et al. |
| 7,999,688 | B2 | 8/2011 | Healey et al. |
| 8,068,025 | B2 | 11/2011 | Devenyi et al. |
| 8,185,277 | B2 | 5/2012 | Flood et al. |
| 8,339,269 | B2 | 12/2012 | Sherron |
| 8,565,536 | B2 | 10/2013 | Liu |
| 8,620,393 | B2 | 12/2013 | Bornstein et al. |
| 8,754,757 | B1 | 6/2014 | Ullrich et al. |
| 9,019,087 | B2 | 4/2015 | Bakircioglu et al. |
| 9,298,260 | B2 | 3/2016 | Karaoguz et al. |
| 9,301,094 | B2 | 3/2016 | Jajoo et al. |
| 9,352,887 | B2 | 5/2016 | Poss et al. |
| 9,443,410 | B1 | 9/2016 | Constien |
| 9,905,090 | B2 | 2/2018 | Ullrich et al. |
| 9,952,600 | B2 | 4/2018 | Gurin |
| 10,064,007 | B1 | 8/2018 | Deluca et al. |
| 10,405,133 | B1 | 9/2019 | Merjanian et al. |
| 10,416,311 | B2 | 9/2019 | Huang et al. |
| 10,559,208 | B1 | 2/2020 | McAlpine et al. |
| 10,621,873 | B1 | 4/2020 | Spiel et al. |
| 10,642,362 | B2 | 5/2020 | Eagleman et al. |
| 2002/0108507 | A1 | 8/2002 | May et al. |
| 2004/0129781 | A1 | 7/2004 | Kreiner et al. |
| 2004/0199401 | A1 | 10/2004 | Wagner et al. |
| 2005/0080520 | A1 | 4/2005 | Kline et al. |
| 2005/0083197 | A1 | 4/2005 | Glenn et al. |
| 2005/0126958 | A1 | 6/2005 | Bohlig et al. |
| 2006/0196937 | A1 | 9/2006 | Kreiner et al. |
| 2006/0261964 | A1 | 11/2006 | Maetzke |
| 2007/0041600 | A1 | 2/2007 | Zachman |
| 2007/0133980 | A1 | 6/2007 | Meyers et al. |
| 2007/0219862 | A1* | 9/2007 | Casella ............... G06Q 30/0215 705/14.17 |
| 2007/0260466 | A1 | 11/2007 | Casella et al. |
| 2008/0031525 | A1 | 2/2008 | Yamaguchi |
| 2008/0061125 | A1 | 3/2008 | Langlois et al. |
| 2008/0061977 | A1 | 3/2008 | Maruca et al. |
| 2008/0140422 | A1 | 6/2008 | Hovestadt et al. |
| 2009/0014363 | A1 | 1/2009 | Gonen et al. |
| 2009/0161907 | A1 | 6/2009 | Healey et al. |
| 2009/0321511 | A1 | 12/2009 | Browne |
| 2010/0001867 | A1 | 1/2010 | Rodrigue et al. |
| 2010/0017127 | A1 | 1/2010 | Pepitone et al. |
| 2010/0042940 | A1 | 2/2010 | Monday et al. |
| 2010/0069035 | A1 | 3/2010 | Johnson |
| 2010/0092089 | A1 | 4/2010 | Wilson et al. |
| 2010/0217715 | A1 | 8/2010 | Lipcon |
| 2010/0287073 | A1 | 11/2010 | Kocis et al. |
| 2010/0312601 | A1 | 12/2010 | Lin |
| 2011/0000295 | A1 | 1/2011 | Kritlow |
| 2011/0063208 | A1 | 3/2011 | Van et al. |
| 2011/0137812 | A1 | 6/2011 | Sherga |
| 2011/0148634 | A1 | 6/2011 | Putz |
| 2011/0175739 | A1 | 7/2011 | McFeeters |
| 2012/0010746 | A1 | 1/2012 | Sundholm |
| 2012/0150754 | A1* | 6/2012 | Belady ................... G06Q 10/30 705/308 |
| 2012/0192646 | A1 | 8/2012 | Arnold et al. |
| 2012/0209783 | A1 | 8/2012 | Smith et al. |
| 2012/0314059 | A1 | 12/2012 | Hoffmann et al. |
| 2013/0006522 | A1 | 1/2013 | Vellaikal et al. |
| 2013/0096731 | A1 | 4/2013 | Tamari et al. |
| 2013/0180892 | A1 | 7/2013 | Marrapodi et al. |
| 2013/0218456 | A1 | 8/2013 | Zelek et al. |
| 2013/0278067 | A1 | 10/2013 | Poss et al. |
| 2013/0295970 | A1 | 11/2013 | Sheshadri et al. |
| 2013/0345969 | A1 | 12/2013 | Udeshi et al. |
| 2014/0005039 | A1 | 1/2014 | Ohishi et al. |
| 2014/0050397 | A1 | 2/2014 | Badholm et al. |
| 2014/0074298 | A1 | 3/2014 | Jambeck et al. |
| 2014/0214697 | A1* | 7/2014 | McSweeney ........... G06Q 10/30 705/308 |
| 2014/0229501 | A1 | 8/2014 | Josefiak |
| 2014/0266698 | A1 | 9/2014 | Hall et al. |
| 2014/0351328 | A1 | 11/2014 | Woods et al. |
| 2015/0081212 | A1 | 3/2015 | Mitchell et al. |
| 2015/0088792 | A1 | 3/2015 | O'Neill et al. |
| 2015/0148077 | A1 | 5/2015 | Jelle |
| 2015/0186497 | A1 | 7/2015 | Patton et al. |
| 2015/0271126 | A1 | 9/2015 | Menayas et al. |
| 2015/0271639 | A1 | 9/2015 | Ziskind et al. |
| 2015/0310606 | A1 | 10/2015 | Shreve et al. |
| 2015/0339864 | A1 | 11/2015 | Herron |
| 2015/0348252 | A1 | 12/2015 | Mask |
| 2016/0003627 | A1 | 1/2016 | Bonhomme |
| 2016/0026253 | A1 | 1/2016 | Bradski et al. |
| 2016/0195602 | A1 | 7/2016 | Meadow |
| 2016/0212590 | A1 | 7/2016 | Decorte et al. |
| 2016/0266258 | A1 | 9/2016 | Huang et al. |
| 2016/0292862 | A1 | 10/2016 | Mask |
| 2016/0355308 | A1* | 12/2016 | Poss ....................... B65D 55/00 |
| 2016/0358429 | A1 | 12/2016 | Ullrich et al. |
| 2017/0109027 | A1 | 4/2017 | Shubs et al. |
| 2017/0124643 | A1 | 5/2017 | Haimi et al. |
| 2017/0169673 | A1 | 6/2017 | Billington et al. |
| 2017/0206889 | A1 | 7/2017 | Lev-Tov et al. |
| 2017/0223499 | A1 | 8/2017 | Jernigan |
| 2017/0289754 | A1 | 10/2017 | Anderson et al. |
| 2017/0353829 | A1 | 12/2017 | Kumar et al. |
| 2017/0366616 | A1 | 12/2017 | Rodrigues Nascimento et al. |
| 2018/0027371 | A1 | 1/2018 | Austraat et al. |
| 2018/0075108 | A1 | 3/2018 | Park et al. |
| 2018/0082279 | A1 | 3/2018 | Vasgaard et al. |
| 2018/0108023 | A1 | 4/2018 | Stewart et al. |
| 2018/0165970 | A1 | 6/2018 | Namgoong et al. |
| 2018/0174067 | A1 | 6/2018 | Spiro et al. |
| 2018/0189835 | A1 | 7/2018 | Deluca et al. |
| 2018/0192237 | A1 | 7/2018 | Privitera et al. |
| 2018/0220061 | A1 | 8/2018 | Wang et al. |
| 2018/0232767 | A1 | 8/2018 | Garg et al. |
| 2018/0262903 | A1 | 9/2018 | Ryan et al. |
| 2018/0268377 | A1 | 9/2018 | Mofardin et al. |
| 2018/0285535 | A1 | 10/2018 | Zhu et al. |
| 2018/0312095 | A1 | 11/2018 | Eletrabi |
| 2018/0338001 | A1 | 11/2018 | Pereira Cabral et al. |
| 2018/0338031 | A1 | 11/2018 | Subramanian et al. |
| 2018/0374046 | A1 | 12/2018 | Powers et al. |
| 2019/0007484 | A1 | 1/2019 | Chen et al. |
| 2019/0026915 | A1 | 1/2019 | Seaman et al. |
| 2019/0102726 | A1 | 4/2019 | Ushiki et al. |
| 2019/0164081 | A1 | 5/2019 | Deluca et al. |
| 2019/0295223 | A1 | 9/2019 | Shen et al. |
| 2019/0313204 | A1 | 10/2019 | Ayoub et al. |
| 2020/0100052 | A1 | 3/2020 | Ellis et al. |
| 2020/0145783 | A1 | 5/2020 | Hanada et al. |
| 2020/0162842 | A1 | 5/2020 | Jones |
| 2020/0252742 | A1 | 8/2020 | Yeon et al. |
| 2020/0344567 | A1 | 10/2020 | Wirola et al. |

FOREIGN PATENT DOCUMENTS

| | | |
|---|---|---|
| CN | 101482742 B | 8/2011 |
| EP | 2284104 A1 | 2/2011 |

(56) References Cited

FOREIGN PATENT DOCUMENTS

| GB | 2386686 A | 9/2003 |
|---|---|---|
| WO | 2012015664 A1 | 2/2012 |
| WO | 2012164098 A1 | 12/2012 |
| WO | 2014079586 A1 | 5/2014 |

OTHER PUBLICATIONS

Karpathy, Andrej, "CS231n Convolutional Neural Networks for Visual Recognition", http://cs231n.github.io/neural networks-2/#losses.

Lamba, Harshall, "One Shot Learning with Siamese Networks using Keras", https://towardsdatascience.com/one-shot-learning-with-siamese-networks-using-keras-17f34e75bb3d, dated Jan. 20, 2019.

Mims, Christopher, "Help, We're Drowning in Recycling! Cue the 'Internet of Trash'", Appeared in the Mar. 2, 2019, print edition as 'The 'Internet of Trash' Aims to Sort Out Our Recycling Mess' https://djreprints.com.

Redmon, Joseph, et al., "YOLOv3: An Incremental Improvement", arXiv:1804.02767, submitted on Apr. 8, 2018, https://doi.org/10.48550/arXiv.1804.02767.

Vicentini, F., et al., "Sensorized waste collection container for content estimation and collection optimization", Waste Management 29 (2009) [retrieved on Oct. 29, 2014]. Retrieved from the Internet: pp. 1467-1472., Jan. 14, 2015 00:00:00.0.

\* cited by examiner

SYSTEM AND METHOD FOR WASTE MANAGEMENT

CROSS-REFERENCE TO RELATED APPLICATIONS

This application is a continuation of U.S. patent application Ser. No. 16/288,593 filed 28 Feb. 2019, which is a continuation of U.S. patent application Ser. No. 14/479,136 filed 5 Sep. 2014, which is a continuation in part of U.S. patent application Ser. No. 14/211,709 filed 14 Mar. 2014, which claims the benefit of U.S. Provisional Application No. 61/801,021, filed 15 Mar. 2013, all of which are incorporated in their entirety by this reference.

TECHNICAL FIELD

This invention relates generally to the waste management field, and more specifically to a new and useful system and method for waste recovery and routing in the waste management field.

DESCRIPTION OF THE PREFERRED EMBODIMENTS

Figure 1:
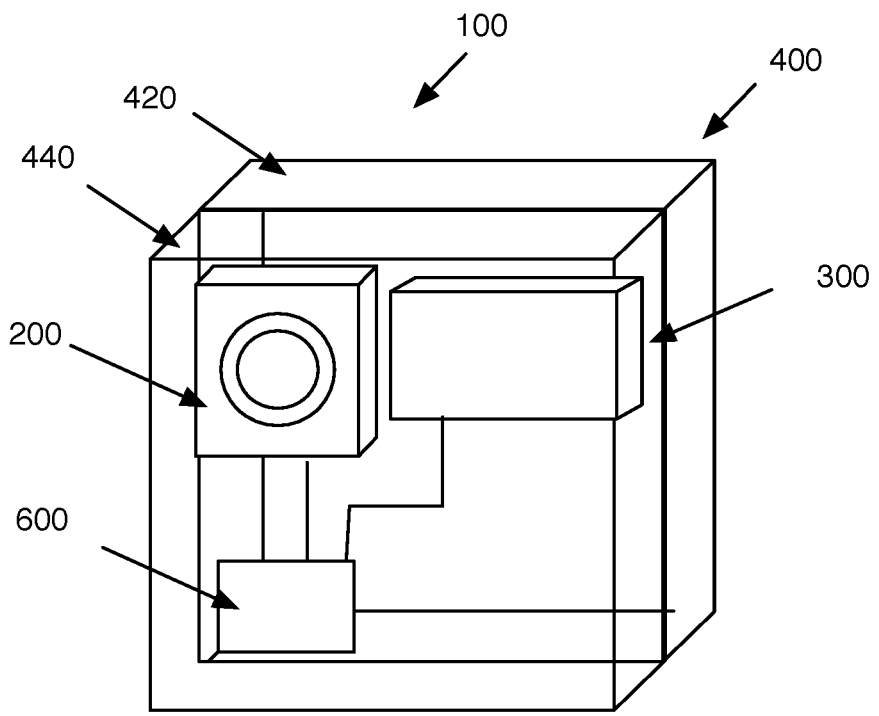
FIG. 1 is a schematic representation of a variation of the monitoring system.
Figure 2:
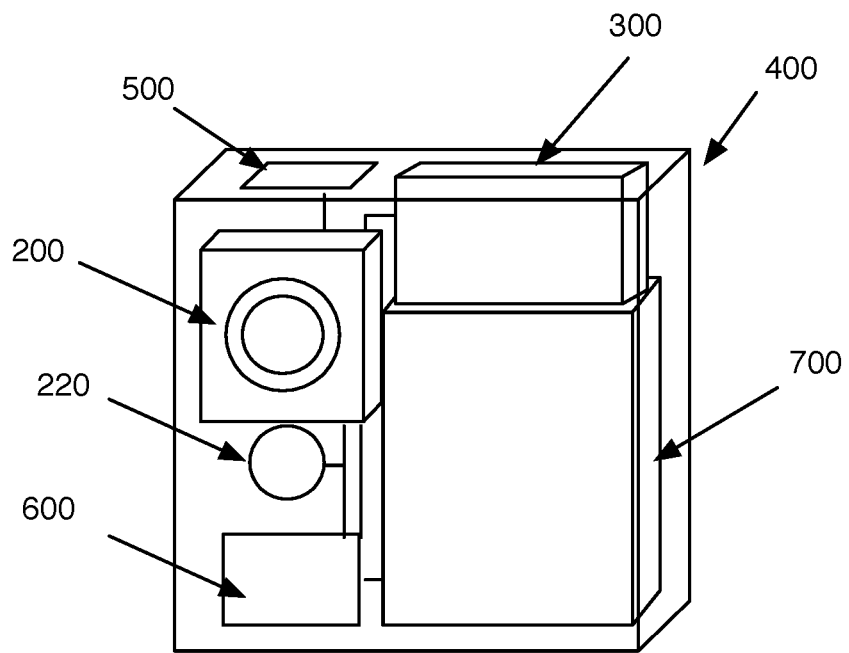
FIG. 2 is a schematic representation of a second variation of the monitoring system.
Figure 3:
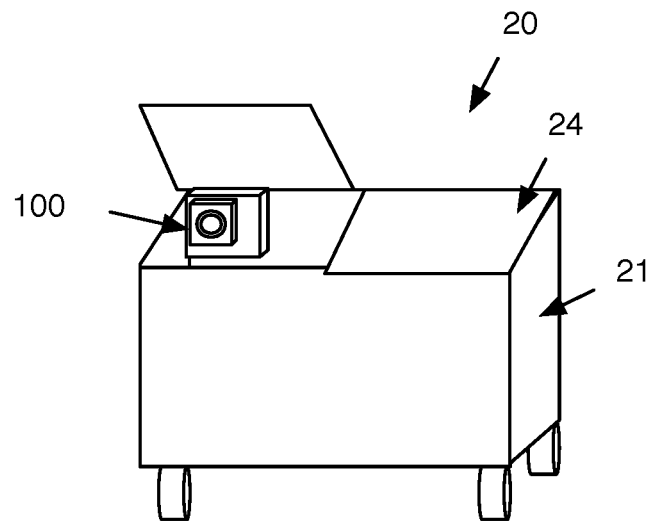
FIGS. 3, 4, and 5 are schematic representations of a first, second, and third variation of waste containers including monitoring systems, respectively.
Figure 4:
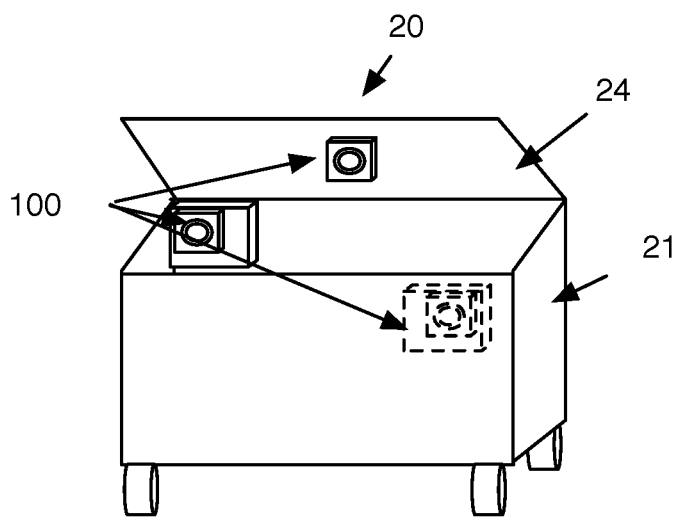
Figure 5:
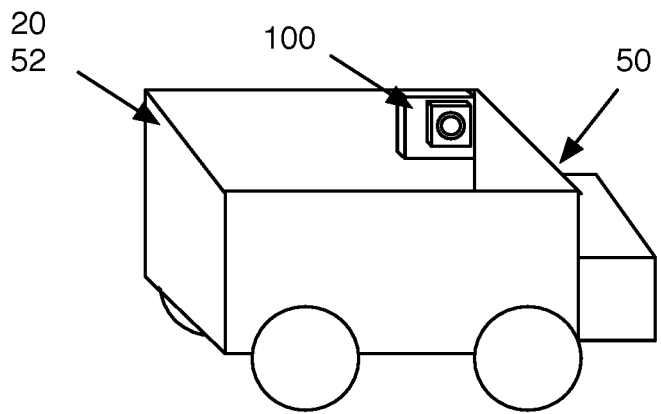
Figure 6:
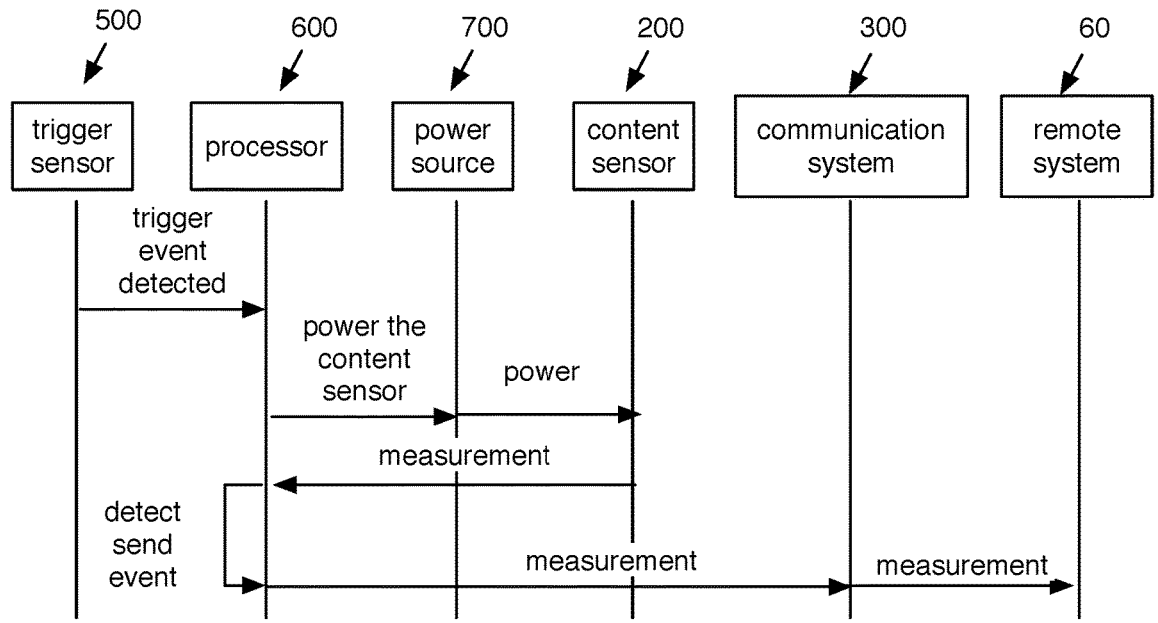
FIGS. 6 and 7 are schematic representations of a first and second variation of the method of recording a measurement of the waste contained within the waste container, respectively.
Figure 7:
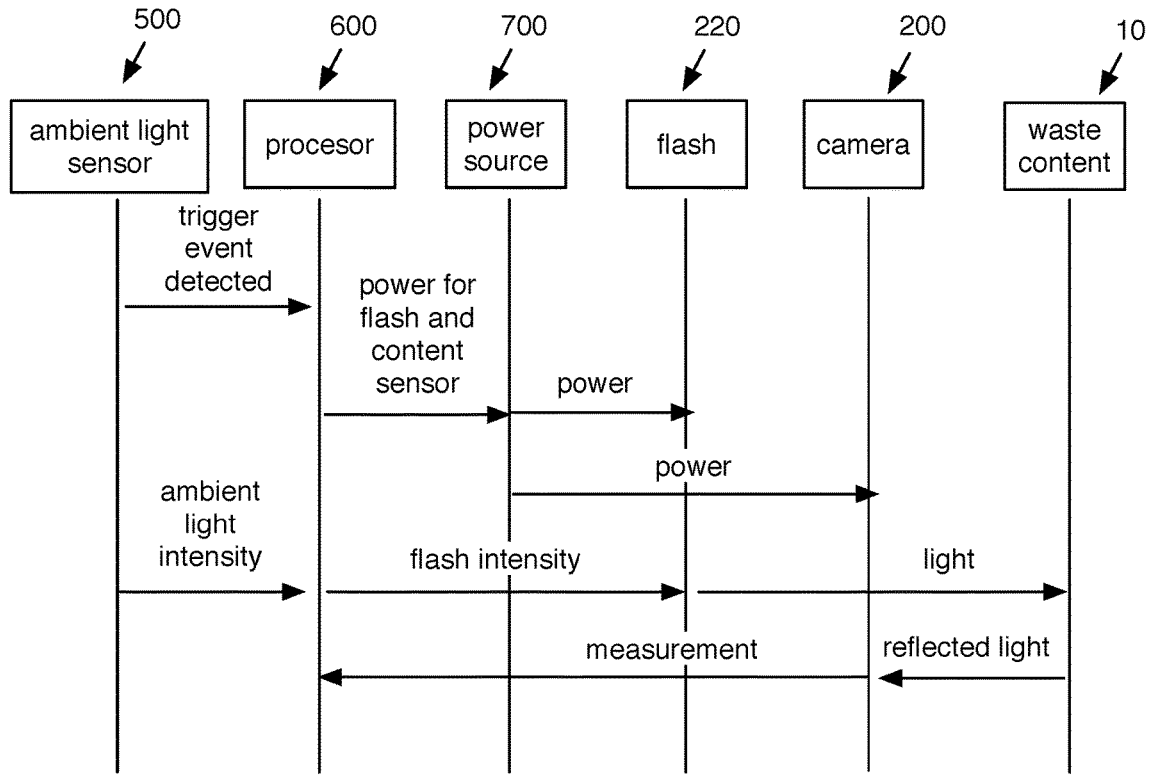
Figure 8:
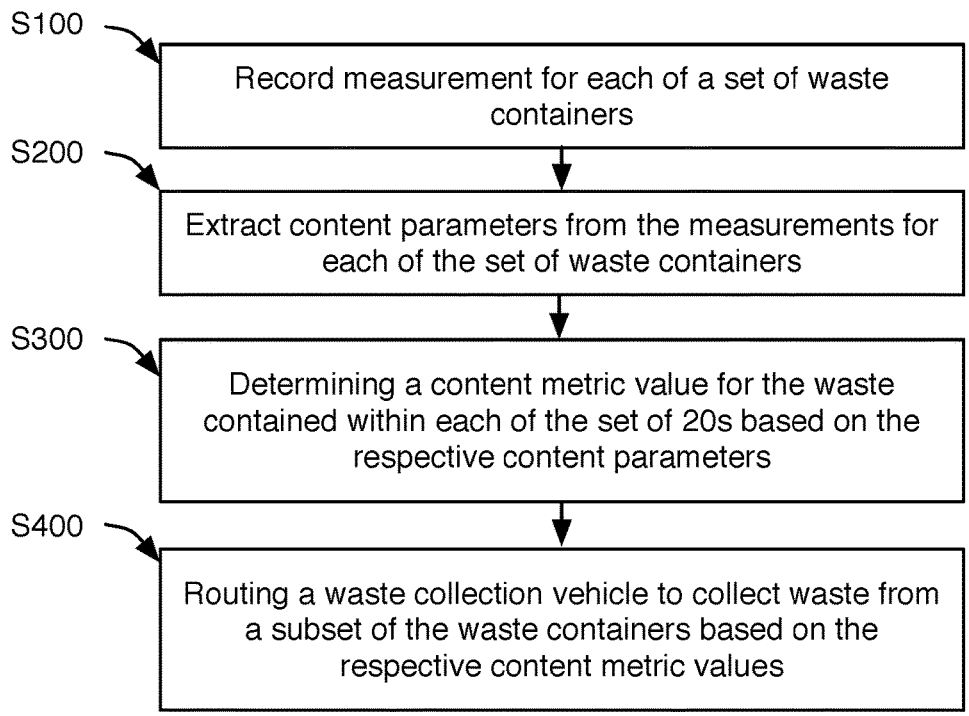
FIG. 8 is a schematic representation of a method of waste management.
Figure 9:
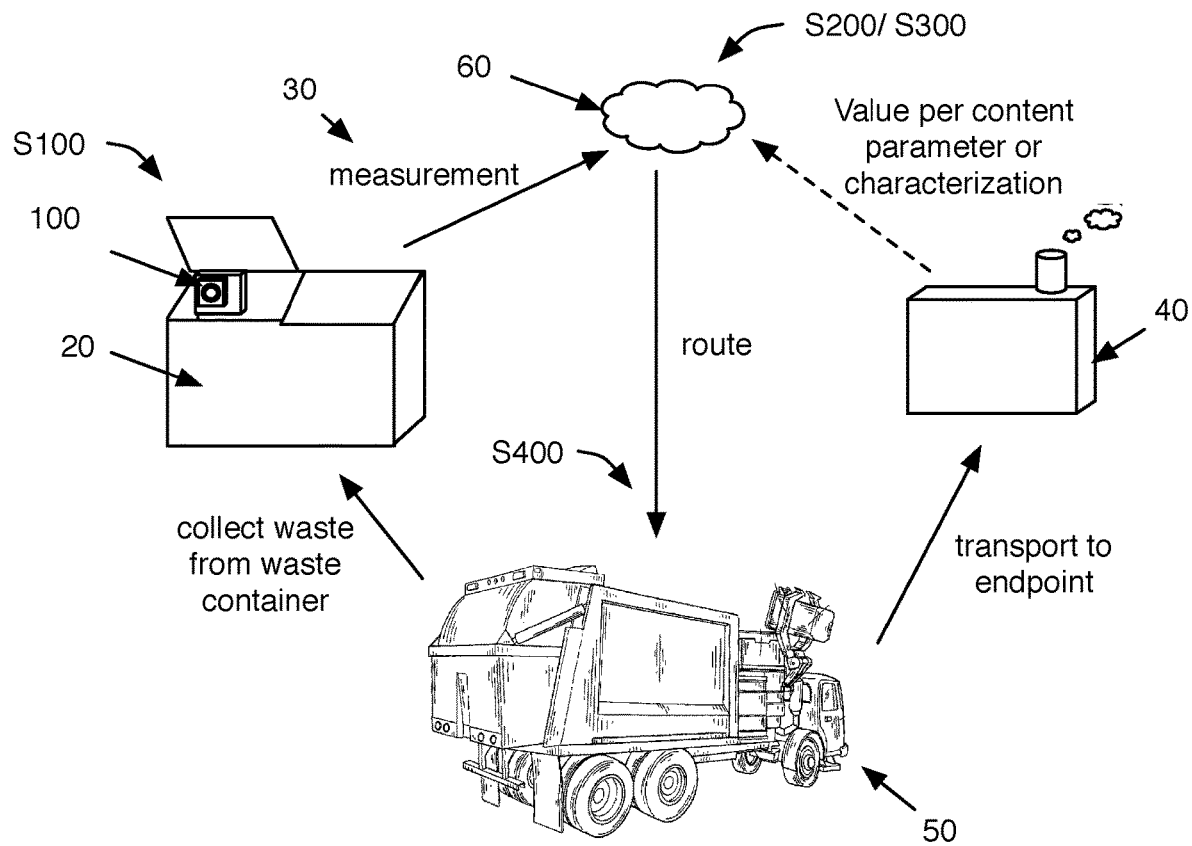
FIG. 9 is a schematic representation of a monitoring system, remote system, waste collection system, and receiving facility performing a variation of the method.
Figure 10:
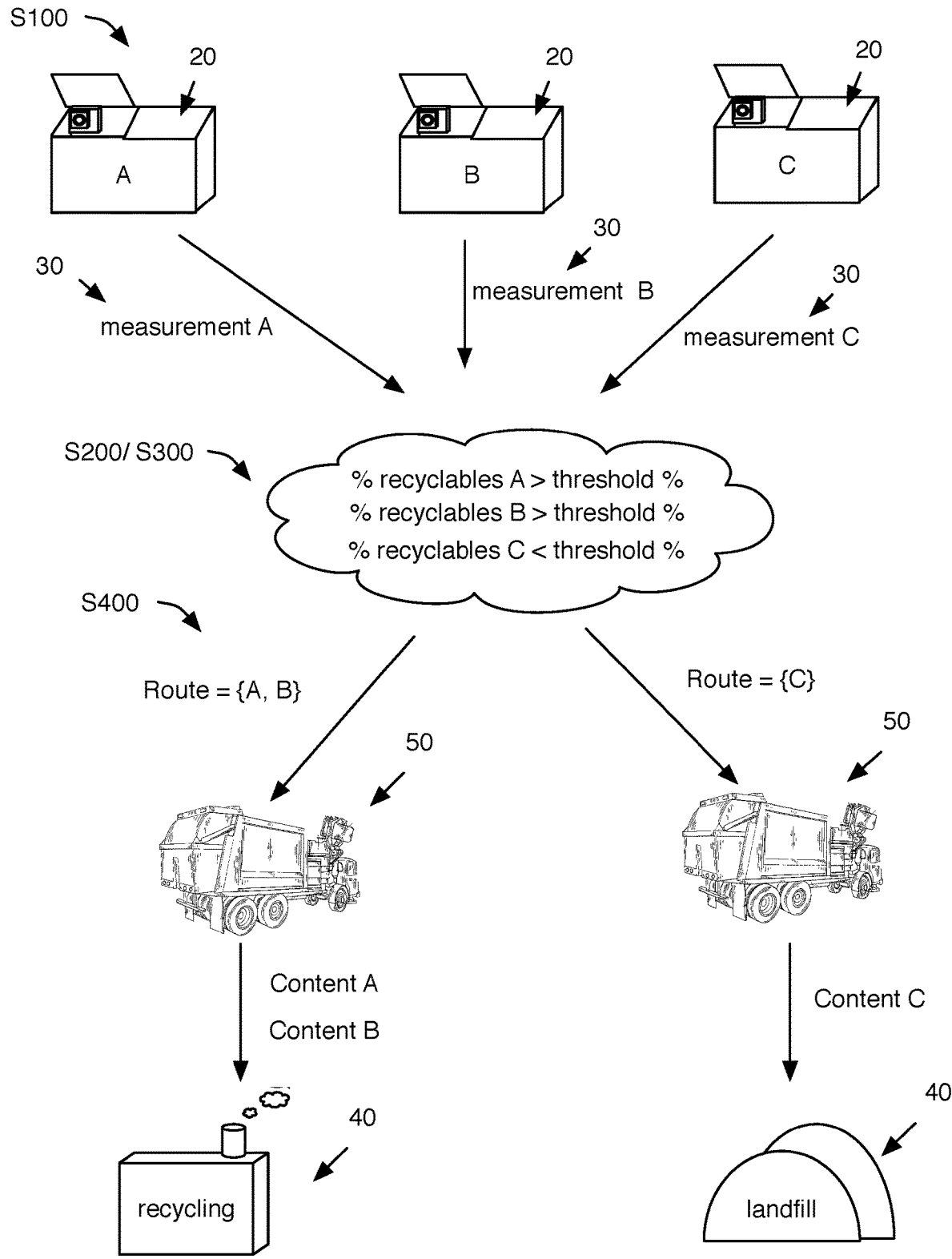
FIG. 10 is a schematic representation of an example of a method of waste management, including recording measurements from waste containers A, B, and C and routing waste collection vehicles to the waste containers based on the respective content metrics.
Figure 11:
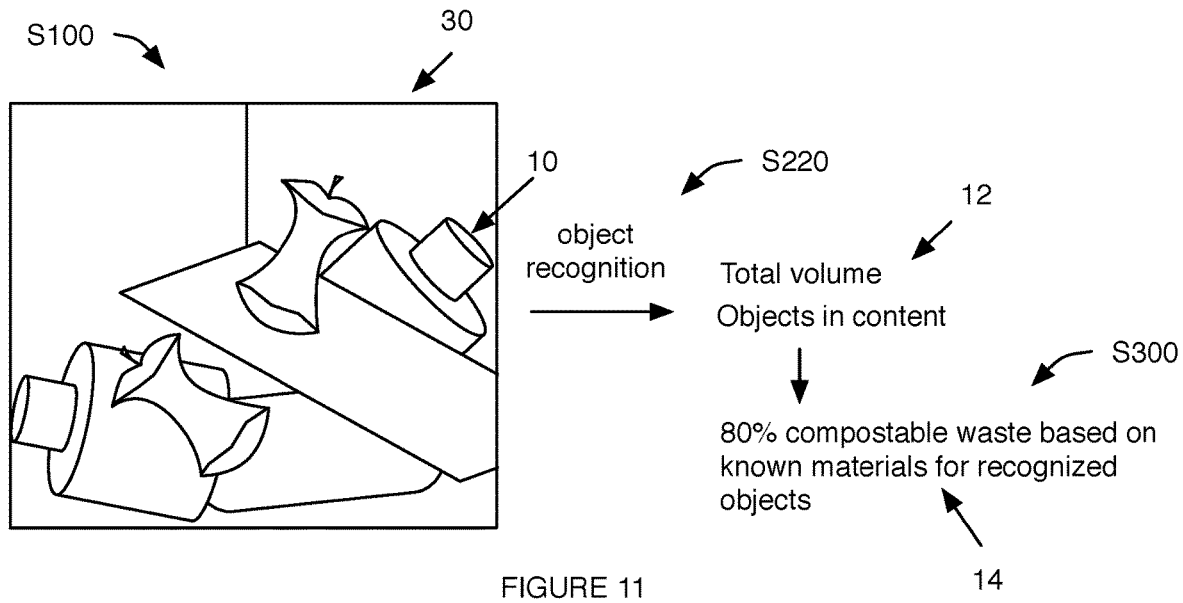
FIG. 11 is a schematic representation of an example of extracting content metric for the waste within the waste container from a measurement using object recognition.
Figure 12:
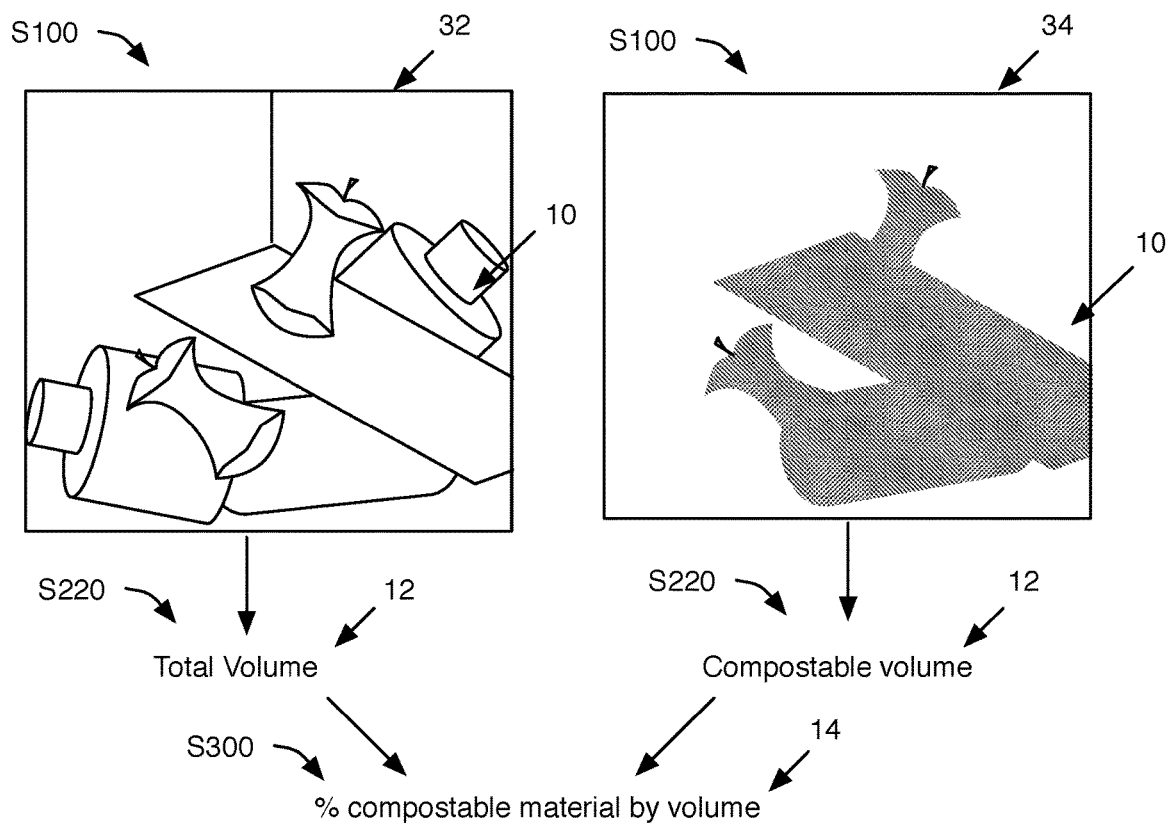
FIG. 12 is a schematic representation of an example of determining the content metric for the waste within the waste container based on a first and second measurement.
Figure 13:
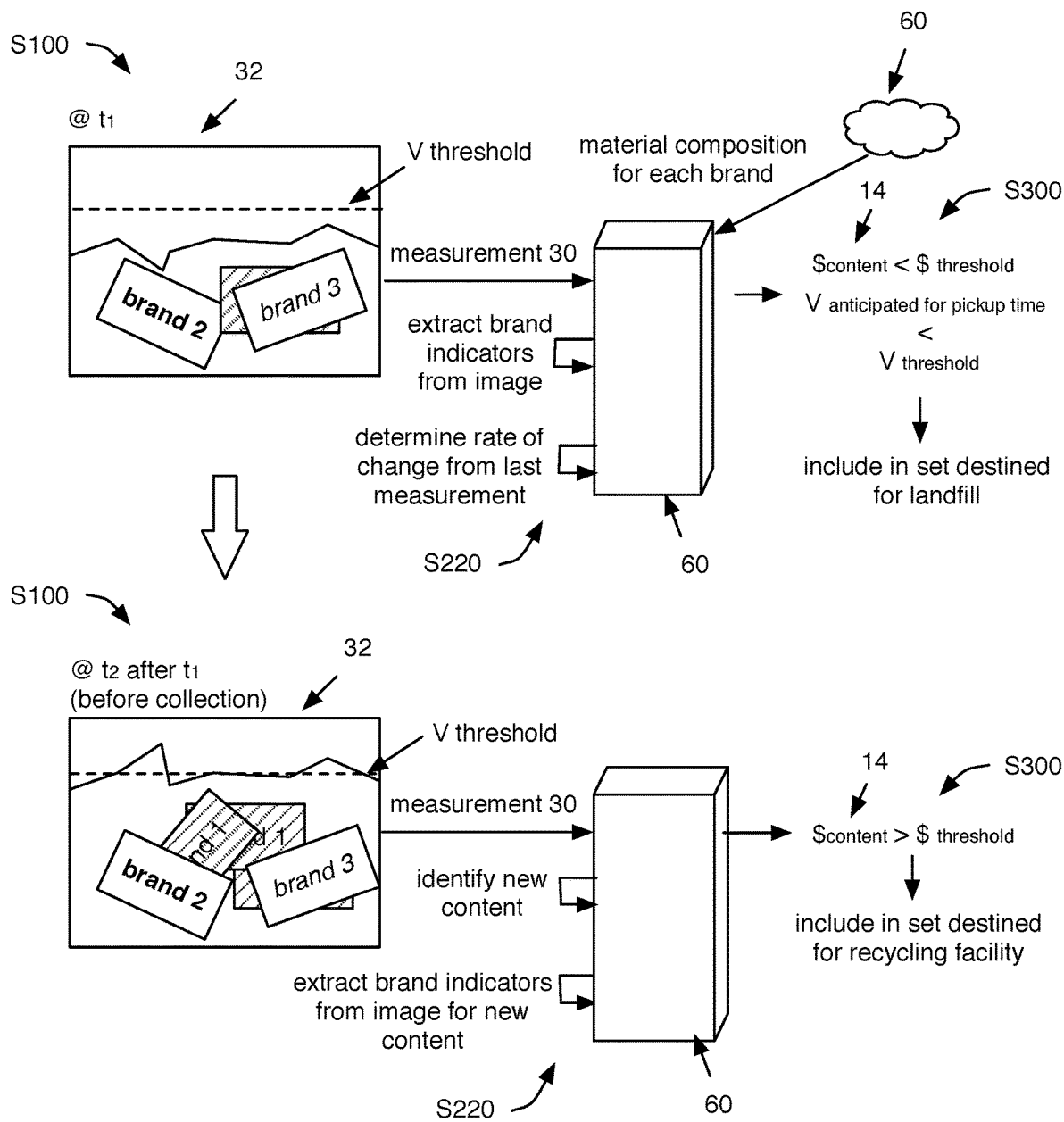
FIG. 13 is a schematic representation of an example of performing the method at a first and second time for the waste within a waste container between waste collections, and rerouting the waste within the waste container in response to a change in the respective content metric.

The following description of the preferred embodiments of the invention is not intended to limit the invention to these preferred embodiments, but rather to enable any person skilled in the art to make and use this invention.

1. System.

The monitoring system 100 preferably includes a content sensor 200, communication system 300, and housing 400, and can additionally include a measurement trigger detection mechanism or any other suitable component. The monitoring system 100 functions to collect information about the contents of the waste container. The contents can be solids (e.g., recycling, trash, compost, etc.), liquids (e.g., cooking oil, motor oil, etc.), gasses, industrial waste, manufacturing waste, or any other suitable material. More preferably, the monitoring system 100 records the measurements 30 of the contents 10 of the waste container 20, but can alternatively collect any other suitable information about the waste container 20.

The collected information can subsequently be used to increase the sorting efficiency at receiving facilities (e.g., recycling facilities, composting facilities, landfills, etc.), increase the accuracy of monetary charges for waste collection, receiving and processing, increase the monetary value of collected waste (e.g., by picking up containers having similar content purity), optimize the collection routes based on waste volume, value, mileage, or any other suitable parameter, to more accurately credit facilities' customers for valuable waste content, to create a market around purchasing the waste contained in a waste container (e.g., through brokering, bidding, etc.), to determine an economic parameter (e.g., health) of a company or economy, to tailor marketing and/or determine the efficacy of an advertising campaign (e.g., wherein brand names can be recognized in the waste), to determine an ideal time to pick up the waste based on the rate of content increase and predicted weather, to leverage waste containers as a temporary storage location for low-value or other waste, or used in any other suitable manner.

The monitoring system 100 is preferably configured to attach to the interior of the waste container, but can alternatively be configured to attach to the exterior, edge, or any other suitable portion of the waste container. The monitoring system 100 is preferably configured or arranged to monitor all or a portion of the waste container interior, but can alternatively be configured or arranged to monitor the contents entering the waste container, the contents about to enter the waste container (e.g., contents that have not broken the plane of the waste container opening), or monitor any other suitable portion of the waste container vicinity.

The content sensor 200 of the monitoring system 100 functions to monitor the content of the waste container by recording measurements 30 of the waste 10. The content sensor 200 is preferably an optical sensor configured to record images, but can alternatively be an audio sensor (e.g., microphone), an electromagnetic sensor (e.g., a magnet or coil, etc.), a near-field communication sensor (e.g. an RFID sensor, NFC sensor, etc.), a weight sensor, a temperature sensor, a chemical compound sensor, metal detector, or any other suitable sensor. Examples of optical sensors include a monocular camera, stereocamera, multi-lens or multi-view camera, color camera (e.g., a RGB camera) such as a charge coupled device (CCD) or a camera including a CMOS sensor, grayscale camera, multispectral camera (narrow band or wide band), hyperspectral camera, ultraspectral camera, spectral camera, spectrometer, time of flight camera, high-, standard-, or low-dynamic range cameras, range imaging system (e.g., LIDAR system), active light system (e.g., wherein a light, such as an IR LED, is pulsed and directed at the subject and the reflectance difference measured by a sensor, such as an IR sensor), thermal sensor, infra-red imaging sensor, projected light system, full spectrum sensor, high dynamic range sensor, or any other suitable imaging system. The optical sensor is preferably configured to capture a 2-dimensional or 3-dimensional image, but can alternatively capture any a measurement having any other suitable dimension. The image is preferably single, multi-pixel, time-averaged or sum total measurement of the intensity of a signal emitted or reflected by objects within a field of view, but can alternatively be a video (e.g., a set of images or frames), or any other suitable measurement. The image preferably has a resolution (e.g., cycles per millimeter, line pairs per millimeter, lines of resolution, contrast vs. cycles/mm, modulus of the OTF, or any other suitable measure) capable of resolving a 1 $cm^3$ object at a sensor distance of at least 10 feet from the object, but can alternatively have a higher or lower resolution. Alternatively, the content sensor 200 can record data that requires two or more measurements, is a single pixel, is location independent, or has any other suitable parameter. The monitoring system 100 can include one or more content sensors of the same or different type.

The content sensor 200 of the monitoring system 100 can additionally be coupled with one or more emitters that are configured to emit electromagnetic signals, audio signals, compounds, or any other suitable interrogator that the content sensor 200 is configured to measure. Alternatively, the content sensor 200 can measure signals from the ambient environment. Examples of content sensor-emitter pairs include LIDAR systems, time-of-flight systems, ultrasound systems, radar systems, X-ray systems, or any other suitable system. When the content system includes an emitter 220, the system can additionally include a reference sensor that measures the ambient environment signals, wherein the content sensor measurement can be corrected by the reference sensor measurement.

The content sensor 200 of the monitoring system 100 can additionally include a lens that functions to adjust the optical properties of the incident signal on the sensor. For example, the optical sensor can include a fish-eye lens to broaden the area monitored by the optical sensor, wherein the resultant distortion is known and can be adjusted for during image processing. However, the lens can be a wavelength filter, polarizing filter, or any other suitable lens. The content sensor 200 can alternatively include a physical or digital filter, such as a noise filter that corrects for interferences in the measurement.

The communication system 300 of the monitoring system 100 functions to communicate data from the monitoring system 100 to a second system. The data can be measurements from the content sensor 200 or any other suitable component, processed measurements, instructions, pickup requests, or any other suitable data. The second system can be a device, server system, or any other suitable computing system. The second system can be remote or wired to the communication system 300. Examples of the second system include a mobile device (e.g., smartphone, tablet, computer), server system, or any other suitable computing system. The communication system 300 can be a wireless or wired communication system. The communication system 300 can be a cellular, WiFi, Zigbee, Z-Wave, near-field communication system (e.g., Bluetooth, RF, NFC, etc.), Ethernet, powerline communication, or any other suitable communication system. The communication system 300 is preferably operable in a standby or off mode, wherein the communication system 300 consumes power at a rate less than a threshold rate, and an on or communication mode, wherein the communication system 300 consumes power at a rate required to communicate data. However, the communication system 300 can be operable in any other suitable mode.

The housing 400 of the monitoring system 100 functions to mechanically protect the monitoring system components, including the content sensor 200 and communication system 300. The housing 400 preferably forms a liquid-impermeable seal about the monitoring system components, but can alternatively be hermetic, fluid-impermeable, gas-impermeable, or have any other suitable characteristic. The housing 400 can additionally include vents, selectively permeable membranes or orifices (e.g., include a Gore™ membrane, etc.), or any other suitable component that permits selective venting or removal of undesirable substances (e.g., fluids) from the housing interior. The housing 400 preferably additionally includes a mounting mechanism that functions to removably or semi-permanently mount to the waste container. The housing 400 preferably includes a back casing 420 and a front casing 440. The monitoring system components are preferably mounted or otherwise supported by the back casing. The back casing can additionally include the mounting mechanism (e.g., along a broad face). The front casing can be translucent, transparent, function as the lens or filter, or have any other suitable optical property. The front casing is preferably transparent or translucent to the signal measured by the content sensor 200, but can alternatively be substantially opaque. The casing can additionally include a gasket or other suitable interface between the front and back casing. The casing can additionally include a mask or other component configured to absorb light emitted by an emitter 200 that is reflected by the front casing, waste object, or any other suitable surface. The mask can absorb light along a predetermined set of wavelengths (e.g., be black), textured, or have any other suitable optical feature.

The monitoring system 100 can additionally include a measurement trigger detection mechanism or auxiliary sensor 500 that functions to determine a trigger event that triggers content sensor measurement of the waste container contents. The measurement trigger detection mechanism can be an ambient light sensor (e.g., wherein the ambient light within the waste container changes each time the lid is lifted), laser beam break sensor (e.g., wherein objects entering the container will break a laser beam directed across the container opening), accelerometer or gyroscope (e.g., wherein lid opening or object landing within the container will shake the monitoring system 100 mounted to the container), timer or clock, or be any other suitable detection mechanism. However, the monitoring system 100 can include a location sensor (e.g., a GPS system, cell tower triangulation system, etc.) or any other suitable sensor. The measurement trigger detection mechanism is preferably oriented at a non-zero angle (e.g., 90 degrees) relative to the content sensor line of view (e.g., axis perpendicular to the sensor), but can alternatively be arranged with an active area parallel to the sensor area or be arranged in any other suitable configuration.

The monitoring system 100 can additionally include a processor 600 that functions to receive measurements from the content sensor 200 and auxiliary sensors (if included) and control communication system operation to send the measurements or information derived from the measurements to the second system. The processor 600 can additionally function to process the measurements (e.g., compress the measurements), perform any suitable portion of the method, or perform any other suitable functionality.

The monitoring system 100 can additionally include a power source 700 or be connected to a remote power source (e.g., a power grid). The power source 700 is preferably a battery, more preferably a secondary battery, but can alternatively be a fuel cell with a fuel source (e.g., metal hydride) or any other suitable power source. The secondary battery can have a lithium phosphate chemistry, lithium ion polymer chemistry, lithium ion chemistry, nickel metal hydride chemistry, lead acid chemistry, nickel cadmium chemistry, metal hydride chemistry, nickel manganese cobalt chemistry, magnesium chemistry, or any other suitable chemistry. The battery is preferably electrically connected to the powered monitoring system components, wherein the processor 600 preferably controls power provision (e.g., through component operation mode control), but power provision and/or battery management can alternatively be performed by any other suitable component.

The monitoring system 100 can additionally be used with or include a measurement processing module and/or a routing module. The modules can be executed on the processor 600 of the monitoring system 100, on a remote system 60 (e.g., a remote server), or on any other suitable computing system. The measurement processing module functions to process the measurements recorded by the content sensor 200 and/or auxiliary sensors 500 to extract a content parameter 12. The content parameter 12 is subsequently used to determine content metrics 14, which classify the contents (waste) of the respective waste container. For example, the content parameter can be used to determine the waste material purity or composition, value, form factor composition, brand inclusion, volume, or any other suitable content characterization.

The content characterization and/or content parameter values can subsequently be used to determine the waste containers that should be emptied (e.g., the waste that should be collected) by a given waste collection vehicle targeted to end at a predetermined, selected, or otherwise determined endpoint. For example, the routing module can select waste containers having a threshold recyclables purity index (e.g., containers containing at least 55% recyclables) for collection by a recycling truck that is assigned to deliver the collected waste to a recycling facility that pays for waste having 55% or more recyclable content. In a second example, the routing module can select waste containers for collection by the recycling truck assigned to deliver the collected waste to a recycling facility to meet a threshold recyclables purity index value for the entirety of the waste anticipated to be collected. In a specific example, if the threshold recyclables purity index value is 55%, the routing module can route the vehicle to collect waste from a first waste container containing content having a 45% purity index and from a second waste container containing content having a 65% purity index. The routing module can additionally function to determine the optimal route (e.g., least expensive, fastest, most cost-effective, etc.) to collect waste from the selected waste containers. However, the monitoring system 100 can be used with any other suitable data processing modules.

The monitoring system 100 is preferably utilized with a waste container 20. The waste container 20 functions to receive and contain waste 10. The waste container 20 can additionally function to supply waste 10 (e.g., when emptied). The waste container 20 is preferably a dumpster, bin, or other container, but can alternatively be the hopper 52, bed, or other suitable portion of the waste collection vehicle. The waste container 20 is preferably substantially rigid, and preferably includes a body that defines a waste-retaining cavity 24 having an open end and a lid 24 that seals the open end. The waste container 20 can be rectangular or have any other suitable configuration. In one variation, the waste container interior can be colored a reference color or include a symbol, line, or other reference indicator, such that the image analysis system can use the reference indicator as a reference point (e.g., calibration color, volume threshold level, position correction reference, etc.). Alternatively, the waste container interior can have a color that absorbs interfering signals, amplifies desired signals, or otherwise influences the content measurement. The waste container is preferably made of metal, more preferably non-ferrous metal but alternatively any other suitable metal, but can alternatively be made of polymer or any other suitable material. The waste container material preferably does not interfere with the content measurement, but can alternatively be made of material that interferes with the content measurement, wherein the noise introduced by the waste container material is preferably known, measured, or otherwise determined and corrected for during measurement processing. The waste container preferably includes a unique identifier stored by the monitoring system 100 or otherwise determined by the monitoring system 100, but can be otherwise identified. The waste container identifier can be a geographic location (e.g., GPS coordinate, latitude/longitude coordinate, etc.), but can alternatively be an RFID identifier, barcode identifier, or any other suitable identifier.

The monitoring system 100 is preferably mounted to the waste container 20 proximal an edge of the waste container opening, more preferably proximal or in a corner of the waste container proximal the opening, but can alternatively be mounted along a wall of the container, the floor of the container, the lid of the container, or along any other suitable portion of the container. Alternatively, the monitoring system 100 can be mounted to a mounting point external the container. One or more monitoring systems can be used for a single waste container. When multiple monitoring systems are used, the monitoring systems are preferably directed at different angles or fields of view. In one example, a first monitoring system can be arranged in a corner of the container proximal the edge, a second monitoring system can be arranged in a second corner proximal the edge adjacent the first corner, and a third monitoring system can be arranged on the interior surface of the lid. However, any suitable number of monitoring systems can be arranged in any other suitable set of positions.

The waste 10 (rubbish, refuse, content, etc.) contained within the waste container 20 can be solid, fluid, liquid, gas, or have any other suitable form factor. Examples of waste include municipal solid waste (household trash/refuse), hazardous waste, wastewater (such as sewage, which contains bodily wastes, or surface runoff), radioactive waste, or any other suitable waste. The waste can be categorized by type (e.g., recyclable, compostable, landfill, etc.), material (e.g., metal, organic, plastic, glass, etc.), form factor (e.g., bottle, bag, etc.), or any other suitable category or subset thereof.

The monitoring system 100 can additionally be used with a waste collection vehicle 50. The waste collection vehicle 50 can belong to a third party waste removal entity, a receiving facility, a retail entity, or any other suitable entity. The waste collection vehicle functions to receive the waste from the waste containers. The waste collection vehicle 50 can include a transportation mechanism, a hopper, and a loading mechanism, but can alternatively include any suitable subset of the above (e.g., wherein the waste collection vehicle 50 is manually loaded) or any other suitable component. The transportation mechanism can include the drive train and/or transmission of a vehicle (e.g., the motor and wheels of a vehicle), but can alternatively include any other suitable transportation mechanism. The transportation mechanism is preferably manually controlled (e.g., by a driver), but can alternatively be automatically controlled (e.g., driverless), wherein the transportation mechanism can automatically drive the waste collection vehicle along the route specified by the method, or along any other suitable route.

The hopper 52 functions to receive and transiently retain the waste from the waste container. The hopper 52 preferably includes a body defining a waste containment volume, and can additionally include a lid. The hopper 52 is preferably made of metal, but can alternatively be made of plastic or any other suitable material. The hopper material preferably does not interfere with the content measurement, but can alternatively be made of material that interferes with the content measurement, wherein the noise introduced by the hopper material is preferably known, measured, or otherwise determined and corrected for during measurement processing.

The loading mechanism preferably functions to transiently couple to the waste container, align the waste container with all or a portion of the hopper opening, empty the waste container into the hopper, place the waste container on the support surface (e.g., the ground), and release the waste container. The loading mechanism can be a pneumatic arm, magnetic arm, or any other suitable loading mechanism.

The waste collection vehicle 50 functions to transport the waste from the waste container(s) to an endpoint. The endpoint is preferably a receiving facility 40 (e.g., waste processing plant), but can alternatively be a second waste container or be any other suitable endpoint. The endpoints can be content-type specific, content-material specific, content-form factor specific, or have any other suitable characteristics. Alternatively, the endpoints can prefer certain waste categories but accept other, non-preferred waste categories. Alternatively, the endpoints can be waste category agnostic. Examples of endpoints include recycling plants (e.g., metal recycling facilities, glass recycling facilities, plastic recycling facilities, etc.), composting plants, landfills, rendering plants, refineries, manufacturing facilities (e.g., wherein the material functions as an input to a manufacturing process), collection facilities, or any other suitable endpoint. The endpoints can additionally publish or otherwise provide a monetary value or cost per content parameter, which can be transmitted to a waste container selection module, the waste containers, an entity associated with the waste collection vehicle, or any other suitable system. An example of monetary value assigned to a content parameter includes a monetary value for a purity index range (e.g., the facility will pay $10 for each pound of waste having a 60%-80% purity index for glass). An example of monetary cost assigned to a content parameter includes a monetary cost for a purity index range (e.g., the facility will charge $20 to receive each pound of waste having a 10-30% purity index for glass).

2. Method.

The method for waste management includes recording a measurement of content within a waste container S100, extracting a set of content parameters from the measurement S200, characterizing the content within the waste container based on the set of content parameters S300, and routing a waste collection vehicle based on the content characterization S400. The method functions to monitor the contents of waste containers in near-real time, at a predetermined frequency, or at any other suitable frequency. The method additionally functions to identify the contents of the waste container, or a parameter thereof. The method additionally functions to identify waste containers for waste removal based on the respective contents and/or identify when to remove waste from the identified waste containers based on the current and anticipated contents. The method additionally functions to select a route and/or endpoint for a waste collection vehicle based on the contents of the identified waste containers. The method is preferably repeated for multiple waste containers over prolonged times, but can alternatively be performed once, performed for a single waste container, or performed at any other suitable frequency. The method is preferably repeated at a predetermined frequency, but can alternatively be performed in response to trigger events or at any other suitable frequency. The method is preferably automatically performed by the system, but can alternatively be performed manually, semi-manually, or otherwise performed.

In one example, the method selects the waste containers for waste removal to maximize the value of the waste collected by a waste collection vehicle. In another example, the method selects the waste containers for waste removal to maximize the purity of the waste collected by a waste collection vehicle. In another example, the method selects the endpoint (e.g., landfill, recycling plant, composting plant, etc.) based on the contents of the collected waste. The method can additionally function to collect information about the contents of a set of waste containers and determine economic parameters (e.g., the health of an economy or entity associated with the set of containers, etc.) based on the information. In a specific example, the method can be used to inform regulators of economic waste parameters, such that the regulators can tailor outreach to influence consumer actions (e.g., increase recycling and/or composing rates). In a second specific example, the method can function to provide information to receiving facilities to predict future facility demand in real- or near-real time, such that the facility can dynamically adjust their resources (e.g., personnel, number of plants running, etc.) to meet the future demand. In a third example, the method can function to provide information to waste generators (e.g., consumers, users, etc.) about their respective waste profile, such that the waste generators can adjust their activity to achieve generator-determined or otherwise determined waste goals (e.g., reduce contamination in waste streams, increase cardboard compaction, etc.). The information can additionally be utilized to provide rebates to the waste generators, or used in any other suitable manner.

The method is preferably performed by the system 100 described above, but can alternatively be performed by a system connected to the monitoring system 100, or by any other suitable system. When the measurements, content parameters, content indices, or other data are processed by a secondary system 60, the monitoring system 100 preferably sends the measurements to the secondary system 60. The measurements, content parameters, content indices, or any other suitable information can be sent by the monitoring system 100 to the secondary system at a predetermined frequency, in response to measurement recordation, in response to recordation of a threshold number of measurements, in response to request receipt, or in response to any other suitable sending event. The communication system 300 is preferably operated in the communication mode to send the data, then switched to a standby, shut off, or power saving mode. This can function to minimize power utilization. Alternatively, the communication system 300 can remain in the communication mode. Alternatively, the receiver can of the communication system 300 can remain in the communication mode, be switched to the communication mode at a predetermined frequency, or be switched to the standby mode, while the transmitter can be switched to the standby mode, be switched to the communication mode at a predetermined frequency, or remain in the communication mode. However, the communication system 300 can be operated in any other suitable manner.

Recording a measurement of content (content measurement) within a waste container S100 functions to record a measurement indicative of a content parameter of interest. The content measurement 30 is preferably recorded by the content sensor(s), but can alternatively be recorded by any other suitable sensor. The content measurement is preferably of at least a portion of the waste container interior, more preferably a majority of the waste container interior (e.g., 100%, 90% of the waste container volume, etc.) but can alternatively be a measurement of the waste container opening, a measurement of an area proximal the waste container opening that is exterior or interior the waste container, or measure any other suitable area or volume relative to the waste container. The content measurement is preferably the output of any of the content sensors or other sensors disclosed above, but can alternatively be the output of any other suitable sensor or system. Recording the content measurement can additionally include emitting a signal, wherein the reflected portions of the signal are recorded by the measurement. However, the content measurement can record signals emitted by an external source, the waste, or signals from any other suitable source.

The content measurement is preferably automatically recorded, but can alternatively be manually recorded (e.g., by a user) or otherwise recorded. The content measurement is preferably recorded in response to the occurrence of a trigger event, wherein the trigger event preferably occurs multiple times between collection events (e.g., wherein the container is substantially emptied of waste), but can alternatively occur once. The content measurement can be recorded during content deposition into the waste container (e.g., as the waste falls into the container), before the content is deposited into the waste container, after the content is deposited into the waste container, or measured at any other suitable time. The trigger event can be indicative of lid actuation, but can alternatively be indicative of waste deposition into the waste container, indicative of any other suitable waste event, the meeting of a time duration (e.g., wherein the measurement is recorded at a predetermined frequency), receipt of a measurement request, or any other suitable trigger event. The trigger event indicative of lid actuation can include an acoustic intensity change beyond an acoustic threshold or acoustic difference threshold (e.g., increase in ambient noise), light intensity change beyond a light threshold or light difference threshold (e.g., increase in ambient light within the container), vibration beyond a vibration threshold (e.g., increase in the system vibration), acceleration beyond an acceleration threshold (e.g., wherein the sensor can be attached to the lid), weight change, actuation of a mechanical indicator (e.g., release of a lever actuated by a closed lid, etc.), or be any other suitable event. The trigger event indicative of waste deposition can include detecting a break in a beam of light directed across the container opening or across any other suitable containment volume cross-section. However, the trigger event can include the satisfaction of any other suitable condition. The content sensor 200 is preferably switched to operation in a recording or capturing mode in response to the trigger event, then switched to a standby, shut off, or power saving mode after content measurement recordation. Alternatively, the content sensor 200 can be operated in the capturing mode for a predetermined period of time, perpetually operated in the capturing mode, or operated in any other suitable manner.

Recording the content measurement S100 can additionally include selecting the measurement to be recorded. This can be used when the monitoring system 100 includes multiple sensors. The content measurement can be selected based on a secondary measurement (e.g., an ambient environment measurement, the trigger event measurement, etc.), but can alternatively be randomly selected or selected in any other suitable manner. In one example, a first content measurement (e.g., a mid-infrared image for measuring moisture content) is selected in response to a content weight increase beyond a weight threshold, and a second content measurement (e.g., a full color monoview image) is selected in response to a content weight increase below the weight threshold. The weight threshold can be the same as or different from the weight threshold used to determine occurrence of the trigger event. However, the content measurement can be selected in any other suitable manner. Alternatively, the set of content measurements that are recorded can be fixed (e.g., based on the sensors that are provided). In one variation wherein the monitoring system 100 includes multiple sensors, the sensors can record content measurements simultaneously (e.g., near-simultaneously), sequentially, or in any other suitable order.

In a first variation, the content measurement is an image. The image can be a single frame, multi-frame (e.g., stereogram), full-color (e.g., along all or a plurality of continuous wavelengths in the visible range), multispectral (e.g., along a range of wavelengths in the visible range), hyperspectral (e.g., along a set of wavelength ranges in the visible range), full-spectral, or be any other suitable image. The image is preferably two-dimensional, but can alternatively be three-dimensional or have any other suitable number of dimensions. In one variation, a virtual model of the waste container contents can be created based on one or more measurements. The virtual model can be 2-D, 3-D, or have any suitable number of dimensions. The virtual model can be time-based, such that the model can function as a record of the waste buildup in the container over time. Recording the image preferably includes operating the respective sensor in a capture mode. Recording the image can additionally include emitting a light having a predetermined set of wavelengths concurrently, within a predetermined period of time before or after, or at any suitable time relative to operating the sensor in the capture mode. The light can be directed in the same direction as the sensor active area, in a direction opposing the sensor, in a direction perpendicular or at any other suitable angle relative to the sensor direction. One or more light sources can be concurrently or sequentially used for the same image or sequential images.

In a first example, the image can be a full-color image 32, wherein the image can subsequently be used to determine the shape of the constituent waste objects, the source of the material (e.g., the brand of the material), or any other suitable parameter.

In a second example, the image can be a reflected light intensity measurement, wherein the image is subsequently used to determine the light reflectivity of the waste content.

In a third example, the image can be a multispectral image, wherein the multispectral image can be subsequently be used to determine the water content, organic content, heat emission, or any other suitable content parameter. In a specific example, the multispectral image can be recorded in the 600-690 nm range and used to determine whether there are man-made objects, such as polymers, in the content of a compost container. In a second specific example, the multispectral image can be recorded in the thermal infrared range (e.g., 10400-12500 nm) and used to determine the amount of heat emitted by the waste, which can be indicative of the number of microbes in the content, the degradation state of the content, the amount of volatile organics produced, or used to determine any other suitable content parameter.

In a fourth example, the image can be a hyperspectral image that is used to determine the volume, concentration, and/or location of a chemical gas. However, any other suitable image can be recorded and used in any other suitable manner.

In a second variation, the content measurement is a content identifier. The content identifier can be attached to the content by a manufacturer, but can alternatively be attached by an intermediate user or by any other suitable entity. The content identifier is preferably a short-range communication identifier, but can alternatively be a long-range communication identifier. Examples of the content identifier include an RFID identifier, NFC identifier, barcode, or any other suitable identifier. In this variation, the content sensor 200 can be a communication receiver, such as an RFID scanner, NFC scanner, or barcode scanner. However, any other suitable content identifier and content sensor can be used.

In a third variation, the content measurement is a material property measurement (material parameter). Examples of material property measurements (material parameters) include acoustical properties (e.g., acoustic absorption, container resonance, etc.), chemical properties (e.g., corrosion, corrosion resistance, pH, reactivity, surface energy, surface tension, hygroscopy, etc.), electrical properties (e.g., resistivity, conductivity, dielectric constant or strength, permittivity, permeability, electromagnetic field strength, etc.), environmental properties (e.g., temperature, pressure, light, humidity, etc.), magnetic properties (e.g., diamagnetism, hysteresis, permeability, etc.), mechanical properties (e.g., compressive strength, hardness, plasticity, resilience, roughness, weight, density, volume, etc.), optical properties (e.g., absorptivity, color, luminosity, photosensitivity, reflectivity, refractive index, scattering, transmittance, etc.), temperature, moisture, or any other suitable property. In this variation, the content sensor 200 can be a material property sensor, such as a microphone, ion meter, chemical compound sensor (e.g., methane sensor), resistometer, current sensor, voltage sensor, magnet, coil, force application mechanism, weight sensor (e.g., scale), optical sensor, or any other suitable sensor. Examples of environmental sensors can include ambient light sensors, humidity sensors, pressure sensors, temperature sensor, or any other suitable sensor capable of measuring an environmental parameter. However, any other suitable measurement can be recorded by any other suitable sensor.

Recording the content measurement S100 can additionally include recording a baseline signal, which functions to provide a measurement of a signal provided by an external signal source. The baseline signal is preferably measured by a secondary sensor, different from the content sensor 200, but can alternatively be measured by the secondary sensor (e.g., wherein the content sensor 200 measures the baseline signal and content measurement sequentially or in any other suitable order) or by any other suitable sensor. The baseline signal that is measured is preferably the same signal type (e.g., wavelength, etc.) as that measured by the content sensor 200, but can alternatively be different, wherein the different signal is preferably related to or influences the content measurement. The baseline signal can be measured concurrently with the content measurement, measured within a time period of the content measurement (e.g., before or after), or measured at any other suitable time.

In a first variation in which the signal measured by the content sensor 200 is provided by an external source, the baseline signal can be used to normalize or otherwise correct the content measurement. For example, the intensity of ambient light can be measured as the baseline signal and used to adjust the color intensities extracted from a full spectrum image (e.g., captured using a CCD) configured to record sunlight reflected by objects.

In a second variation in which the signal measured by the content sensor 200 is provided by a system emitter 220, the baseline signal can be used to correct the content measurement for noise imposed by the external environment. For example, the ambient noise levels and/or patterns can be measured and used to remove and/or correct the sound of waste falling into the container.

In a third variation, the baseline signal can be used to determine the difference between a parameter of the signal provided by an external source and a desired parameter. For example, the method can include measuring the ambient light intensity, determining the amount of auxiliary light that is required to obtain a target light intensity (e.g., wherein the auxiliary light is emitted in response to the ambient light intensity falling below an intensity threshold), controlling a light source to provide auxiliary light (e.g., a flash), and recording an image concurrently or within a threshold time period of auxiliary light emission. However, the baseline signal measurement can be used in any other suitable manner.

Extracting a set of content parameters from the measurement S200 functions to analyze the measurement to determine indicators of the waste composition or material. The content parameters are preferably extracted each time a set of measurements are recorded, but can alternatively be extracted at a predetermined frequency, after a predetermined number of measurement sets are recorded, or extracted at any other suitable frequency. The content parameters are preferably extracted by a computing system remote from the monitoring system 100, but can alternatively be extracted by the monitoring system 100 or any other suitable computing system. The content parameters can be extracted for a single piece of waste, for a portion of the total waste associated with (e.g., contained within) the container at the time of content measurement, for the entirety of the waste associated with (e.g., contained within) the container, or for any other suitable set of waste objects associated with the container. One or more content parameters (e.g., a set or plurality) of content parameters can be extracted from the measurement.

The content parameters extracted from the measurement can include material parameters (e.g., as disclosed above), object boundaries (e.g., of individual objects, the main body of waste within the container, etc.), brand identifiers (e.g., brand names, trademarks, barcodes, etc.), content status (e.g. structural status, such as crumpled or uncrumpled, decomposition status, etc.), or any other suitable parameter indicative of a characteristic of the content. Alternatively, when the measurement is a product or object identifier, the content parameter can be determined based on the identifier. Alternatively, the content parameter can be a change of a material parameter, object parameter (e.g., container fill rate, container fill acceleration), or any other suitable change over time. However, the content parameter can be any other suitable measure indicative of content classification.

The content parameters can be determined for the entirety of the measurement, but can alternatively be determined on a pixel-by-pixel basis (e.g., wherein a parameter value is determined for each pixel then summed, averaged, or otherwise processed for a set of pixels), determined from a portion of the measurement (e.g., one or more pixels), determined based on multiple measurements, or be determined based on any other suitable set or subset of measurements. For example, the reflectivity of content (e.g., indicative of content material composition) can be determined based on a ratio of white to black over an entire grayscale image, can be determined by determining the ratio for each pixel or set of pixels then summed over the entire image, or determined in any other suitable manner.

The content parameters can be determined from a single content measurement, from a content measurement and a baseline measurement, from a first and a second content measurement taken within a predetermined period of time, from a first and a second content measurement taken at least a predetermined period of time apart (e.g., wherein the first and second content measurements are preferably the same type of measurement but can alternatively be different measurements), or from any other suitable set of measurements.

In an example of determining the content parameters from a single content measurement, a full color image can be analyzed to extract object boundaries. In an example of determining the content parameters from a content measurement and a baseline measurement, the intensities of one or more wavelengths of interest are extracted from a full color image and corrected by the ambient light intensity measurement.

In an example of determining the content parameters from a first and a second content measurement taken within a predetermined period of time, a full color image is used to identify object boundaries and/or generate a virtual representation of the objects within the waste container, wherein the object boundaries and/or virtual representation are used to identify parameter values corresponding to the object in a second content measurement taken within a predetermined period of first content measurement recordation, such as a multispectral image. In a specific example, the absolute or relative location of a pixel of the object in the full color image is determined and used to identify the corresponding set of pixels in the second content measurement. In a second example, a full color image is used to identify the change in volume of the contents within the container, an audio recording is used to identify the mass of the newly added waste, and the volume and mass can be used to determine the density of the newly added waste, which can subsequently be used to determine the composition of the waste.

In an example of determining the content parameters from a first and second content measurement taken at least a predetermined period of time apart, the first and second content measurements can be full color images, wherein the volume of the content within the container can be determined from each measurement and compared to obtain a change in waste volume over time.

Extracting the content parameter from the measurement S200 preferably includes determining the content parameter based on the signal values, but can alternatively include otherwise extracting the content parameter from the measurement. Extracting a content parameter can include extracting the content parameter from an image or set of images S220, extracting the content parameter from an audio clip, identifying an identifier based on the measured signal (e.g., processing an RF signal to extract an identifier), or extracting the content parameter in any other suitable manner.

Extracting a content parameter from an image S220 preferably includes applying image processing techniques to the image to extract gradients in intensity, saturation, color, or any other suitable light parameter, identify edges or borders, identify objects, or to extract any other suitable set of content parameters from the image. Examples of image processing techniques include computer vision methods, appearance methods, feature methods, optical character recognition methods (e.g., to identify trademarks or brand names), or any other suitable methods.

In variations wherein the image is captured after waste has been deposited into the waste container 20 (e.g., when the waste is static or has stopped falling), the content parameters extracted from the one or more images can be extrapolated to determine the content parameters for the entire contained waste mass (e.g., assumed to be representative of the entire waste mass, etc.). Alternatively, one or more types of images can be combined to determine the content parameters for the body of waste as a whole. For example, the mass of conductive material (e.g., metal) can be determined based on the conductivity of the entire body of waste. In variations wherein the image is captured as the waste falls into the waste container, the content parameters can be determined for the newly added waste, the body of waste as a whole, for each object, or for any suitable subset of the waste.

Examples of computer vision methods include shape or pattern recognition based on supervised or unsupervised machine learning techniques, segmentation techniques, point of interest identification, or any other suitable computer vision method. For example, a machine can be trained to recognize empty chip bags based on a set of empty chip bag images, wherein the machine can subsequently be used to identify empty chip bags in the image.

Examples of appearance methods include edge matching (e.g., using Canny edge detection, template comparison, etc.), divide and conquer searching, grayscale matching, gradient analysis (e.g., matching), histograms of receptive field responses, shape recognition based on supervised or unsupervised machine learning techniques, eigenvector matching, or any other suitable appearance method.

In one example of edge matching, edges (e.g., viewpoint dependent or independent edges) are identified within the image (e.g., using search-based methods, zero-crossing based methods, or any other suitable edge detection method) and compared with an object template to identify objects. The template edges can be rotated, partially obscured, scaled, or otherwise adjusted to match the edges in the image. The template can additionally be aligned with the image, combined with other templates, or otherwise used. Edge sets having beyond a threshold similarity with the template are preferably assigned as the object associated with the template. Alternatively, the number of overlapping edges between the template and image can be counted to identify the object, the number of template edge pixels within a predetermined pixel distance from an image edge can be counted to identify the object, the probability distribution of the distances between the edges in the image and the edges in the template can be used to estimate the likelihood that a set of templates correctly anticipate the objects in the image. However, any other suitable edge matching technique can be used.

In one example of divide-and-conquer searching, the method includes determining a score for an image portion based on the portion similarity with a portion of a object template, the portion resolution, portion gradient uniformity, or based on any other suitable parameter, and recursively segmenting the portion of the image into sub-portions in response to the score falling below a threshold. However, any other suitable divide-and-conquer search method can be used.

In one example of grayscale matching, the method includes computing the pixel distance as a function of both pixel position and pixel intensity from an image. The grayscale match can be determined from a single image or can be determined based on multiple images, each associated with a different illumination intensity, can be compared to extract the edges. This method can be applied to images recorded using any suitable set of wavelengths.

Examples of feature methods include searching through interpretation trees, iterative testing, pose consistency, pose clustering, invariance, geometric hashing, scaleoinvariant feature transform, speeded up robust features, but any other suitable feature identification method can be used. In one example of searching through an interpretation tree, a tree of possible waste objects is used. For each set of boundaries identified in the image, the tree is searched for a probabilistic match. Historically identified objects associated with the container can have higher probabilities than objects that were not historically identified. However, search trees can be otherwise used.

Images can suffer from insufficient content information, particularly in variations wherein the image is captured after waste has been deposited into the waste container (e.g., when the waste is static or has stopped falling). This is because the image typically only captures information in a fixed set of planes or views, and cannot record measurements of waste that is obscured by secondary waste proximal the sensor or emitter 220. To resolve this issue, the content parameters extracted from the one or more images can be extrapolated to determine the content parameters for the entire contained waste mass (e.g., assumed to be representative of the entire waste mass, etc.). Alternatively, one or more types of images or measurements can be combined to determine the content parameters for the entire waste mass. For example, an electromagnetic measurement can be combined with a volume measurement to estimate the ferrous material content in the waste mass. However, the content parameters of obscured waste can be otherwise determined.

Extracting the content parameters from the measurement S200 can include extracting an audio pattern from the audio measurement and/or parameters of the audio pattern. For example, the audio frequency can be extracted and subsequently used to determine the type of material that the waste is made of (e.g., wherein metallic objects are associated with different frequencies than glass objects). In a second example, a wavelength can be extracted and subsequently used to determine the type of material that the waste is made of or the shape of the object (e.g., wherein different wavelengths are associated with different material compositions or shapes).

Extracting the content parameters from the measurement S200 can include determining a composition of the waste content based on an electromagnetic measurement. For example, the permeability of an electromagnetic field through the body of the waste can be indicative of the ferrous material content of the waste.

Characterizing the content within the waste container based on the set of content parameters S300 functions to determine a set of content metric values for the waste within the container, wherein the metric values 14 can be used to select the waste containers to be emptied. The content is preferably characterized each time a set of measurements are recorded, but can alternatively be characterized at a predetermined frequency, after a predetermined number of measurement sets are recorded, or characterized at any other suitable frequency. The secondary system preferably characterizes the content, but the monitoring system 100 can alternatively characterize the content. Characterizing the content can include categorizing the content by material, object, parameter, or based on any other suitable category, wherein the material, object, and parameter are the metrics. Alternatively, characterizing the content can include calculating one or more indices for the content, wherein the indices are the metrics. However, any other suitable value for any other suitable content metric can be determined. Examples of indices that can be calculated include purity indices, plant indices (e.g., organic material indices, such as NDVI), contamination index, value index, or any other suitable index. The purity index is preferably calculated for a given material (e.g., metal, plastic, paper, organic material, etc.), or subset thereof, object (e.g., bottle, bag, box, etc.), waste type (e.g., recyclable, compost, landfill, etc.), brand, or for any other suitable category, but can alternatively be a measure of material mixing, material uniformity (e.g., material distribution) throughout the container volume, or be a measure of any other suitable parameter. The purity index is preferably by volume (e.g., a volume ratio), but can alternatively be by mass or by any other suitable parameter. Examples of material subsets that can be identified include cardboard, plastics (e.g., PET, PTFE, etc.), metals, organics, paper products (e.g., printer paper, newspaper, etc.), ceramics, construction material, e-waste (e.g., copper, silicon, etc.), aluminum, copper, steel, biohazardous material, textiles, chemicals, animals, fecal matter, food scraps, packaging, Styrofoam, or any other suitable material.

The purity index can be a mass ratio, volume ratio, degree measure, or any other suitable ratio. Each container can be associated with one or more indices.

In one example, the purity index can be the percentage of a compostables in the waste container, wherein the mass of the compostables can be determined based on volumetric measurements (e.g., from images) and the known or estimated density of the compostable material, and the mass of the total waste in the container can be determined from volumetric measurements (e.g., from the same or different images as those used to identify the compostable volume) and a weight measurement.

In a second example, the method can include identifying brand trademarks (e.g., brand names, colors, etc.) in the waste (e.g., using OCR or other image recognition methods), retrieving packaging material information such as packaging material composition (e.g., glass, type of plastic, etc.), form factor, or any other suitable information based on the brand trademarks (e.g., from an on-board or remote storage system), and calculating the mass of a given type of packaging material based on the number of times a trademark is detected and the retrieved information.

In a third example, the method can include recording thermal measurements of a plurality of points within the waste container (e.g., using multiple thermal sensors or taking a thermal image 34 of the waste container interior), determining the distribution of heat or heat sources within the waste container (e.g., indicative of organic waste decomposition), and determining a degree of material mixing based on the heat distribution. For example, an index value associated with a high degree of material mixing can be determined in response to substantially even heat distribution throughout the container or heat gradients below a threshold gradient value, and a second index value associated with a low degree of material mixing can be determined in response to segregation between high heat zones and low heat zones or heat gradients above a threshold gradient value that is the same as or different from the first gradient value.

In a fourth example, the method can include identifying contaminants within the waste container (e.g., using object recognition) and calculating a contamination index based on the mass, volume, orientation, or other parameter of the contaminants. For example, recycling contaminants such as plastic bags, shredded paper, scrap metal, hazardous waste, diapers or other bio-hazardous waste, non-recyclable plastics (e.g., Styrofoam), flattened containers, capped jars, liquids, ceramics, and frozen food containers can be identified within the waste container, the mass and distribution of contaminants determined, and the contamination index calculated based on the mass and distribution of the contaminants. However, the contamination index can be otherwise determined.

Characterizing the content S300 can additionally include determining a monetary value for the content within the container (content value). The monetary value is preferably determined based on market rates for the waste and the content characterization. The market rate can be a rate for the waste material retrieved from a global market, received from a receiving facility 40 (e.g., landfill, recycling plant, etc.), bidder on an exchange, or obtained from any other suitable source. The market rate is preferably updated in near real time, but can alternatively be updated in response to a request or at any other suitable frequency. In one variation, the content value is determined based on the market value of a given type of material and the mass of the given type of material within the container or other content parameter for the container. For example, the content value of a container with 10 lbs of cardboard is preferably more than the content value of a container with 5 lbs of cardboard.

In another variation, the content value is determined based on the market value of a given type of material, the mass of the given type of material within the container (or other content parameter for the container), and the purity index or contamination index for the material, wherein higher contamination indices or lower purity indices can lower the content value. For example, the content value of a waste container containing 50% glass preferably has a higher content value than a waste container containing 25% glass and a mixture of other materials. In another example, the content value of a waste container containing 50% glass that is segregated from the remainder of the material (e.g., by bags, located in a different compartment or area of the container, etc.) preferably has a higher content value than a waste container containing 50% glass interspersed with the remainder of the material.

In another variation, the content value is determined based on the purity index or contamination index. The content value is preferably a linear function of the purity index, but can alternatively be a logarithmic function, exponential function, step function, or any other suitable function of the purity index or contamination index. The content value preferably varies directly with the purity index and indirectly with the contamination index. The content value is preferably determined by the receiving facility 40, but can alternatively be calculated or otherwise determined.

Characterizing the content S300 can additionally include predicting waste changes. Predicting waste changes can include determining future changes in the parameters or indices for the entirety of the waste within the container, such as anticipated volume changes, material distribution changes (e.g., composition changes), spatial distribution changes, or any other suitable bulk change. These changes can result from predicting the parameters of the waste that will be deposited into the waste container in the future. Predicting waste changes can also include anticipating future changes in the waste currently retained by the waste container, such as chemical and/or physical changes to the waste due to decomposition. The waste changes are preferably determined based on historical waste data for the waste container, but can alternatively be determined based on historical waste data for a population of similar waste containers (e.g., waste containers associated with a certain type of waste, such as recycling bins, or waste containers associated with a similar entity or business type, etc.), be determined based on a database, or be determined in any other suitable manner.

Routing a waste collection vehicle based on the content metric values S400 functions to more efficiently allocate waste management resources. Routing the waste collection vehicles based on the content characterization can function to maximize monetary returns to the waste collectors, minimize costs to the waste collectors, increase the efficiency of the receiving facilities, or otherwise influence waste collection, waste processing, or any other suitable waste management process.

The waste collection vehicles are preferably routed in response to the occurrence of a routing event. The routing event can be the passing of a predetermined period of time (e.g., wherein the waste collection vehicles are routed at a predetermined frequency), in response to receipt of a user request, in response to a threshold number of waste containers satisfying a condition (e.g., a volume condition, value condition, purity condition, etc.), in response to determination of an adverse change (e.g., anticipated contaminant deposition into an otherwise pure waste container), or in response to the occurrence of any other suitable event. The waste collection vehicle preferably travels along the selected route, collects waste from select waste containers along the route, transports the waste to an endpoint, and deposits the waste at the endpoint. The waste collection vehicle can additionally verify the content parameters and/or content characterizations (e.g., purity, contamination, value, etc.) with a monitoring system 100 on the vehicle (e.g., on the hopper, on the arm, or arranged in any other location on the vehicle).

Routing the waste collection vehicle based on the content metric values 400 preferably includes selecting a subset of waste containers for collection (retrieval) by a waste collection vehicle. The subset of waste containers is preferably selected to meet a threshold parameter or index value. The method preferably additionally includes recording measurements, determining content parameters, and characterizing the content for a plurality of waste containers. The waste from the subset of waste containers are preferably collected by the same waste collection vehicle, but can alternatively be collected by different collection vehicles. Multiple subsets of waste containers can be selected for the same or different collection vehicles. The waste containers are preferably included in a single subset, but can alternatively be included in multiple subsets.

In a first variation, the subset of waste containers are selected based on the respective volumes of the waste container. The waste containers that have content volumes exceeding a volume threshold are selected for inclusion in the subset. The volume threshold is preferably predetermined, but can alternatively be dynamically determined (e.g., based on receiving facility charges, value of the content, etc.) or otherwise determined.

In a second variation, the subset of waste containers are selected based on the purity index and/or contaminant index.

The waste containers of the subset are preferably selected to meet a target total purity index (e.g., for the waste contained in the waste collection vehicle at the end of the route), but containers associated with purity indices falling within a predetermined range, exceeding a purity index threshold, or satisfying any other suitable condition can additionally or alternatively be included in the subset. The purity index threshold is preferably predetermined, but can alternatively be dynamically determined (e.g., based on receiving facility charges) or otherwise determined. In a first example, a first waste container having a 50% purity index for recyclables and a second waste container having a 70% purity index for recyclables can both be selected for inclusion in the subset when the target total purity index is 60%. In a second example, waste containers having purity indices for corrugated cardboard over a threshold purity index value are selected for inclusion in the subset. In a third example, waste containers having a purity index below a threshold purity index value or having a contamination index above a threshold contamination index value are selected for inclusion in the subset. The waste containers included in the subset can additionally satisfy the volume condition, as discussed in the first variation.

In a third variation, the subset of waste containers is selected based on the content value. The waste containers of the subset are preferably selected to meet or maximize a total content value (e.g., for the waste contained in the waste collection vehicle at the end of the route), but can alternatively be selected to meet an average content value for the totality of content collected during the route, selected because the respective content value falls within a value range or exceeds a cost threshold, or selected because the content satisfies any other suitable condition. The waste containers included in the subset can additionally satisfy the volume condition and/or purity index condition, as discussed in the first and second variations. The respective content values, volumes, purity indices, contamination indices, or any other suitable waste characterization or parameter can be entered into an optimization equation to determine the subset of waste containers marked for pickup. In one example, only waste containers having purity indices for recyclables above a threshold index value and having content values above a threshold value are selected. In a second example, a first waste container having a high content value and a second waste container having a low content value and purity index can be included in the subset in response to the second waste container exceeding a volume threshold (e.g., requiring urgent collection). In a third example, a first waste container having a high content value for copper and a low volume can be marked for collection while a second waste container having a low content value for copper and a high volume close to or exceeding the volume threshold is not marked for collection when the value of the first waste container exceeds the cost of not collecting the second container. However, the waste containers can be otherwise selected.

In a fourth variation, the subset of waste containers is selected based on the parameters of the predicted waste changes (e.g., magnitude of waste change, rate of waste change, acceleration of waste change, etc.). The subset can additionally be selected based on the instantaneous waste parameters or indices. For example, a first waste container is selected for inclusion in a waste container subset to be emptied at a first time range, even though the first waste container had not met the volume threshold, when the purity index for the waste container is anticipated to decrease after the first time range.

However, the subset of waste containers can be selected based on any other suitable combination of content parameters and characterizations.

Routing the waste collection vehicle based on the content characterization S400 can additionally include selecting a route between the subset of waste containers for the waste collection vehicle. The route can be selected to optimize fuel use, vehicle operation cost, user satisfaction, pickup ease (e.g., based on predicted or instantaneous weather, etc.), or any other suitable parameter.

Routing the waste collection vehicle S400 can additionally include selecting an endpoint for the waste collection vehicle. The endpoint is preferably a receiving facility, such as a recycling facility, composting facility, landfill, or any other suitable facility. The endpoint is preferably selected based on the waste characterization (e.g., indices, value, etc.) of the waste to be collected and/or collected waste, but can alternatively or additionally be selected based on the content parameters or based on any other suitable factor. For example, a recycling facility can be selected for waste collection vehicles collecting waste from waste containers having a purity index for recyclables over an index value threshold, a composting facility can be selected for waste collection vehicles collecting waste from waste containers having a purity index for compost over an index value threshold, and landfill can be selected for waste collection vehicles collecting waste from waste containers having a contamination index over an index value threshold or purity indices under an index value threshold. In another example, a first facility (e.g., recycling or composting facility) can be selected in response to the content value exceeding a threshold value (e.g., the cost to collect waste from the selected waste containers, $0, or another monetary value), and a second facility (e.g., a landfill) can be selected in response to the content value falling below a threshold value (e.g., below $0).

The endpoint can be predetermined or dynamically determined. For example, in response to detection of an unexpected contaminant entering the waste collection vehicle hopper based on a measurement from a monitoring system 100 attached to the waste container or the hopper, the purity index, cost, or other parameter can be dynamically recalculated, and the waste collection vehicle dynamically rerouted based on the new parameter value. In a specific example, if the contaminant caused the total waste value to be unacceptable to the previously selected endpoint (e.g., recycling facility), a second endpoint, such as a landfill, can be selected for the waste collection vehicle. The subset of waste containers can additionally be dynamically adjusted, such that the subset assigned to the waste collection vehicle can include waste containers having contamination indices above a threshold value (e.g., waste containers containing waste that would have had to go to the landfill).

A single endpoint is preferably determined for each waste collection vehicle route (e.g., duration between the vehicle collection vehicle leaving a start point, collecting waste from at least one container, and ending at an endpoint), but multiple endpoints can alternatively be selected for each route. In one example, the waste containers can include layers of material, wherein each material layer has a different purity index for a different material (e.g., the first layer is glass-rich, the second layer is cardboard-rich, and a third layer is plastic-rich). In this variation, the waste collection vehicle can separate the layers during collection, such as by dumping the contents of the container into a glass hopper until the second layer is substantially reached, and multiple endpoints corresponding to the different material types (e.g., glass, cardboard, and plastic processing facilities, respectively) can be selected as the endpoints for the route.

An alternative embodiment preferably implements the above methods in a computer-readable medium storing computer-readable instructions. The instructions are preferably executed by computer-executable components preferably integrated with a vehicle routing system that functions to select waste containers for waste collection during a route based on analysis of the waste in the waste containers, and to select an endpoint for the route. The vehicle routing system can include a waste measurement system that functions to measure the parameters of waste within a set of waste containers one or more times between waste collection, and a waste analysis system that functions to analyze the waste measurement to determine the waste composition, value, or any other suitable parameter. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

We claim:

1. A method for waste management, comprising:
sampling information indicative of waste entering a waste container, wherein the waste container is configured to contain waste material;
at an optical sensor arranged within the waste container, sampling at least one image of content within the waste container, comprising, in response to sampling the information, capturing a first image of content within the waste container;
based on the at least one image, determining a volume parameter associated with the content;
estimating a time at which the volume parameter will exceed a threshold value; and
based on the estimated time, after sampling the at least one image, routing a waste removal vehicle to a location of the waste container such that the waste removal vehicle reaches the location before the estimated time.

2. The method of claim 1, further comprising:
for each waste container of a plurality of waste containers:
sampling respective information indicative of waste entering the respective waste container;
capturing at least one measurement of content within the respective waste container, comprising, in response to sampling the respective information, capturing a first measurement of content within the respective waste container; and
based on the at least one measurement, determining a respective volume parameter for the content;
based on the respective volume parameters, selecting a subset of the plurality of waste containers for retrieval; and based on the selection, routing a set of waste removal vehicles to retrieve content from the selected subset of waste containers.

3. The method of claim 2, wherein, for each waste container of the plurality, the at least one measurement comprises an image.

4. The method of claim 3, wherein, for each waste container of the plurality, the image is captured at a respective camera sensor arranged within the waste container.

5. The method of claim 2, wherein, for each waste container of the subset, the waste container is selected in response to the respective volume parameter exceeding a respective threshold value.

6. The method of claim 2, wherein routing the set of waste removal vehicles is performed such that, after retrieving content from the selected subset of waste containers, a fullness metric for at least one waste removal vehicle of the set exceeds a threshold value.

7. The method of claim 2, wherein the set of waste removal vehicles consists of one waste removal vehicle.

8. The method of claim 2, further comprising, for a first waste container of the plurality, based on the at least one measurement, estimating a time at which the respective volume parameter will exceed a threshold value, wherein the subset of the plurality of waste containers is selected based further on the estimated time.

9. The method of claim 8, wherein, for the first waste container: the at least one measurement comprises a time series of images sampled over a period of time, wherein estimating the time is performed based on the time series.

10. The method of claim 9, wherein the first measurement of content comprises a first image of content within the first waste container, wherein the time series comprises:
the first image; and
a second image captured in response to sampling second information indicative of additional waste entering the first waste container.

11. The method of claim 1, wherein, for each waste container of the plurality, the information indicative of waste entering the respective waste container comprises information indicative of ambient light intensity within the respective waste container exceeding a threshold value.

12. The method of claim 1, wherein, for each waste container of the plurality, the respective volume parameter is indicative of a fullness percentage defined as a ratio of content volume to waste container volumetric capacity.

13. The method of claim 1, wherein the volume parameter is determined at a processor mechanically connected to at least one of the waste container or the optical sensor.

14. The method of claim 13, wherein routing the waste removal vehicle is performed at a remote computing system in communication with the processor.

15. The method of claim 13, wherein estimating the time is performed at the processor.

16. The method of claim 1, wherein routing the waste removal vehicle is performed at a remote computing system.

17. The method of claim 1, wherein the at least one image comprises a time series of images, wherein estimating the time is performed based on the time series.

18. The method of claim 17, wherein the time series comprises:
the first image; and
a second image captured in response to sampling second information indicative of additional waste entering the first waste container.

19. The method of claim 1, wherein the information indicative of waste entering the waste container comprises information indicative of ambient light within the waste container exceeding a light threshold.

20. The method of claim 1, wherein the volume parameter is indicative of a fullness percentage defined as a ratio of content volume to waste container volumetric capacity.

21. The method of claim 1, wherein the at least one image comprises at least one stereoscopic image.

* * * * *